May 13, 1969 J. E. EDGELL 3,443,316

TAPE RULE LOCK

Filed Dec. 19, 1966 Sheet 1 of 2

INVENTOR.
James E. Edgell
BY B. B. Olm
J. Bruce Ross, J.
ATTORNEYS

INVENTOR.
James E. Edgell

BY B. B. Olm
J. Bowen Ross, Jr.
ATTORNEYS

1

3,443,316
TAPE RULE LOCK

James E. Edgell, Wexford, Pa., assignor to H. K. Porter Company, Inc. (Delaware), Pittsburgh, Pa., a corporation of Delaware Filed Dec. 19, 1966, Ser. No. 602,790
Int. Cl. G01b 3/10
U.S. Cl. 33—138 6 Claims

ABSTRACT OF THE DISCLOSURE

A push button operated tape lock is embodied in a resilient wall housing of a coiled spring actuated type tape rule. The push button member deforms internally of the tape housing when pushed inwardly so as to engage and positively lock the tape in its then position. Squeezing of the housing walls or manipulation of the push button member causes the member to be released and the inherent resiliency of the member restores it to a nonlocking position.

CROSS REFERENCE TO RELATED APPLICATIONS

The present invention relates to and may readily be employed in conjunction with tape rules of the type disclosed in co-pending applications Ser. No. 558,411 filed June 17, 1966, and Ser. No. 561,567 filed June 29, 1966, now Patent Number 3,381,916. The present and subject co-pending applications are related in that each of the inventions disclosed therein teaches employment of manually operable, resilient and deformable braking members for locking or braking the tape portion of a coilable tape rule in a given position.

BACKGROUND OF INVENTION

(1) *Field of invention*

This invention pertains to means for locking or braking the tape portion of a coilable tape rule in selected withdrawn positions. Such devices are sometimes classified as reels with brakes (Class 242, sub 107.3 e.g.) and at other times as a tape reel feature (Class 33, sub 138 e.g.).

(2) *Description of the prior art*

Patent 3,114,515 represents a class of such patents in which the tape is releasably braked; that is, the tape is subjected to frictional braking sufficient to overcome the spring tension but in an amount substantially less than required to positively lock the tape. In contrast, see Patent 3,214,836 as representing a somewhat different class of patents more in the nature of positive locking devices; that is, devices which will effectively lock the tape in a given position so that it will not move axially except when strongly forced in an axial direction.

Referring again to Patent 3,114,515, this patent also represents a type of brake which can be applied in graduated amounts such that if the rule is extended, say, its full length and the operator wants it extended to half its length, the operator can release the brake and then gradually restore and release the braking action as required to bring the rule to a half-withdrawn position. Stated differently, the type of brake construction embodied in Patent 3,114,515 does not necessarily need to be fully applied or fully released but can be employed in a slipping clutch like action. In contrast, the usual positive lock device does not lend itself to this type of operation.

Another characteristic which can be observed in various conventional braking and locking devices is the employment of resilient members which usually take the form of metallic coil or leaf springs and which are employed to regulate the braking action and for the purpose of restoring the brake to a release position. In any event, the conventional practice requires a multiplicity of parts to provide a convenient thumb or finger actuated brake or lock press member as well as a member or members to accomplish the actual braking or locking action.

2

In the referred to co-pending applications there is taught an improved releasable type braking construction which is obtained by forming the housing with resilient and deformable side walls and using braking plates which depend for position on the wall positions. When the side walls are squeezed together the braking action of the plates is released and when free of manual pressure the side walls assume a position which causes a braking action to be applied by the plates. The construction taught by the co-pending applications eliminates the need for the usual metal leaf or coil braking springs and provides a smooth clutch like releasable braking action which is desirable and satisfactory for most tape positioning requirements; however, such construction does not provide means for positively locking the tape.

SUMMARY OF INVENTION

With the foregoing in mind, the present disclosure has as an object providing a construction which allows the employment in the same tape rule of both a positive type lock as well as a releasably engaging type brake.

Another object is to provide a positive locking construction for a tape rule which does not require the usual coil or leaf type return spring.

Another object is to provide a tape rule having both releasable braking and positive locking means each of which operates through employment of resilient and deformable finger positioned members.

Another object is to provide a tape rule with means for both positively locking and releasably braking the tape but arranged such that each can be operated independently.

Other objects will be seen as the description proceeds.

In the embodiment of the invention which is disclosed in both co-pending applications and the present application, a so-called "sidecase" forms the bottom wall and the two side walls in the assembled rule. The side walls in particular are resilient and deformable and the sidecase is held together by a clip which snaps in place over the side walls. A recoil spring which may be of the usual construction mounts on a slotted post. This post is formed within and as an integral part of the sidecase. Of special interest to the present invention is the use of a drum member which has an integral flange and rotatably mounts on the same post. The recoil spring, coiled within the drum, is connected at one end to the post and extends through a slot in the drum side wall. The measuring tape is fastened to a portion of the spring outside the drum and is coiled around the drum and rests against the flange.

A pressure plate mounts loosely on the post opposite the side of the tape which rests on the drum flange such that the drum flange and the pressure plate can be forced towards each other and thereby brake the tape at any desired extension of the tape. When the rule is assembled, the drum flange and pressure plate will assume a position which causes them to assert a releasable braking action on opposite edges of the tape. The sidecase and other members of the rule are so arranged, however, that this pressure can be released either gradually or completely by squeezing the sides of the rule somewhat like pushing in on the bottom of an oil can. Thus, the operator can squeeze the sides of the case to release the drum flange and the pressure plate and such action will free the tape for easy withdrawal.

Also contained within the interior and lower front portion of the case is a push button member operated lock mechanism which slidably mounts in one side wall and which can be depressed to positively lock the tape in any given position to which it has been extended. The lock may be released by squeezing the sides of the case or by disengaging the push button member. When the sides are squeezed, the tape is both unlocked and retracted whereas if the lock only is disengaged, the tape is not retracted. The tape lock works on a principle similar to the sidecase brake in utilizing a resilient and deformable member for its braking and spring characteristics. The tape lock incorporates a shaft and a thin, resilient web formed as part of a sleeve which is slidably mounted on the shaft. Outside the housing, the sleeve terminates in a push button knob. When the knob is pushed in, the web flexes and presses against the tape in a locking relation and the sleeve assumes a locked position by reason of a notch in the top of the sleeve engaging the edge of the hole in the side wall in which the sleeve resides. Squeezing the case or pushing down on the knob acts to disengage the sleeve from the hole in the case and the inherent resiliency of the web returns the sleeve and knob to an "off" position.

DRAWING DESCRIPTION

DETAILED DESCRIPTION

Figure 1:
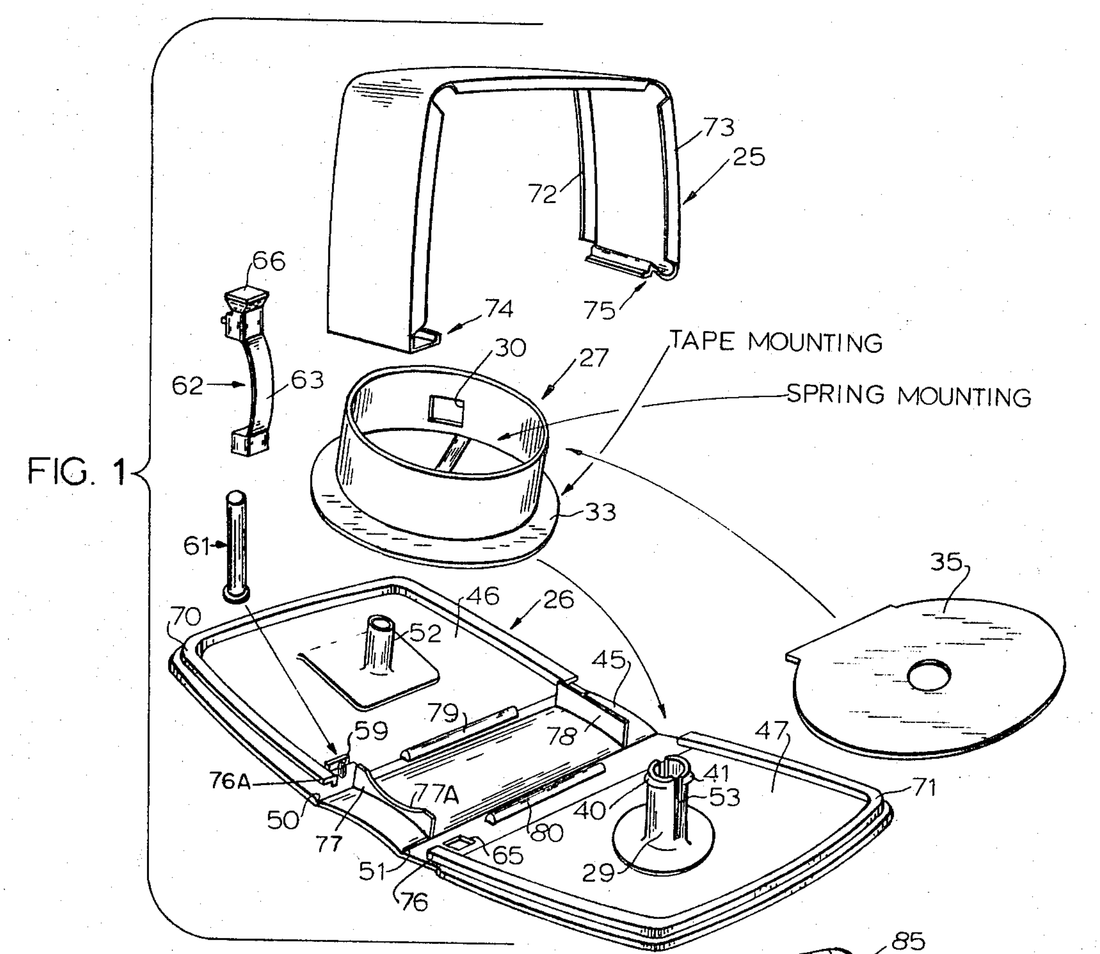
FIGURE 1 is an exploded perspective view of a tape rule embodying the invention.

The rule housing as conventionally known is made up in the present invention from an assembly of a clip 25 to a sidecase 26. Sidecase 26 includes a bottom wall 45, a left side wall 46 and a right side wall 47. Sidecase 26 is preferably formed of a resilient deformable material in the nature of a plastic such as polypropylene or polyethylene which enables walls 45, 46 and 47 to be molded as an integral piece. By utilizing relatively thin lines of juncture, as indicated at 50, 51, the bottom wall 45 is effectively hinged to side walls 46 and 47. A flanged drum 27 is mounted on a post 29 which post is formed integral with sidecase 26 and includes a slot 53. A recoil spring 28, which may be of the usual construction, is mounted on post 29 in engagement with slot 53 and resides within drum 27. Drum 27 has a slot 30 which receives spring 28 and a conventional tape 32 is coiled around drum 27 with one edge resting against the drum flange 33. A pressure plate 35, whose purpose is later explained, is mounted on post 29 opposite flange 33.

The previously referred to post 29 mounts centrally of left side wall 46 and is hollow so as to receive a mating stud 52. Stud 52 forms an integral part of left side wall 46 and serves the purposes of aligning the two case halves during assembly and preventing the outer end of post 29 from collapsing after assembly. Enlargements 40, 41 on post 29 hold the parts in working relation and in particular act to retain drum 27 and pressure plate 35 in assembly and to limit their travel on post 29. At this point in the description, it should be noted that so far as the releasable brake portion of the invention is concerned, such braking function is achieved primarily by the interaction of the side walls 46, 47, the flange 33 and the pressure plate 35. This action is referred to later and the description next turns to the mechanism involved in providing a positive lock for the tape as compared to a releasable brake.

Tape lock mechanism 60 includes a shaft 61 which at one end has a recess 67 which receives a pin 59 which in turn extends from and is integral with left side wall 46. A sleeve 62 slidably mounts on shaft 61 and includes an intermediate section which is cut away so as to leave only a thin, resilient, deformable web 63. It is particularly desirable that web 63 be resilient yet sufficiently rigid when bent to firmly force tape 32 against tape guide 77. Zytel 101, a nylon type plastic made by E. I. du Pont and Company of Wilmington, Del. is suited to the purpose. In one embodiment sleeve 62 is formed of this material and web 63 is made .020 inch thick and 0.180 inch wide.

Figures 10, 11, 12, 13:
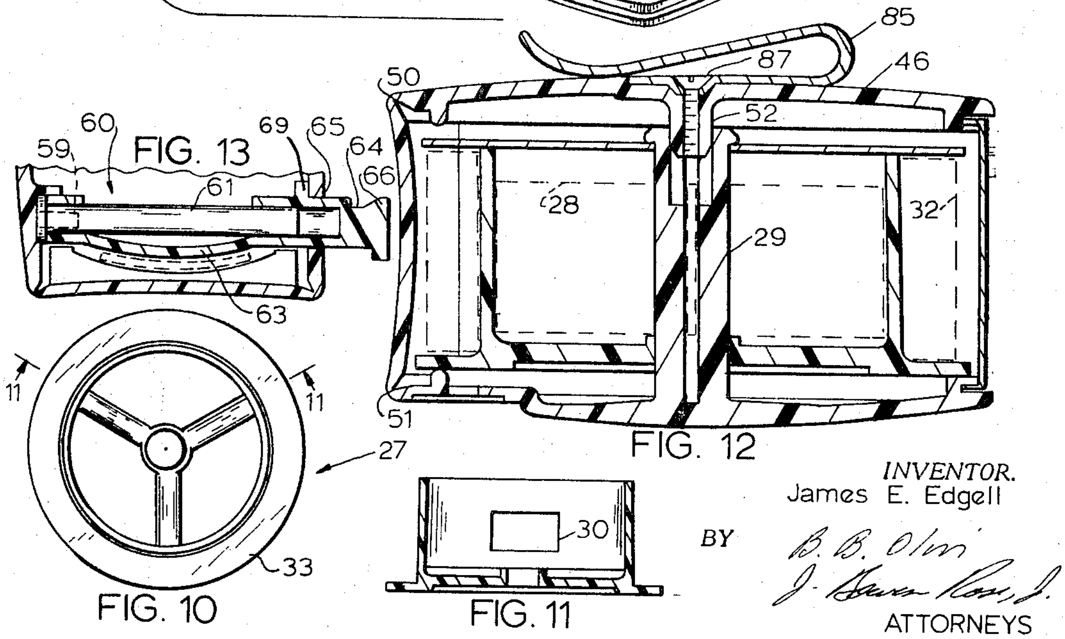
FIGURE 10 is a plan view of the flanged drum.
FIGURE 11 is an elevation section view taken along line 11—11 of FIGURE 10.
FIGURE 12 is an enlarged elevation section view of the assembled rule showing the internal braking means.
FIGURE 13 is a fragmentary section view of the locking mechanism in unlocked position.
Figure 2:
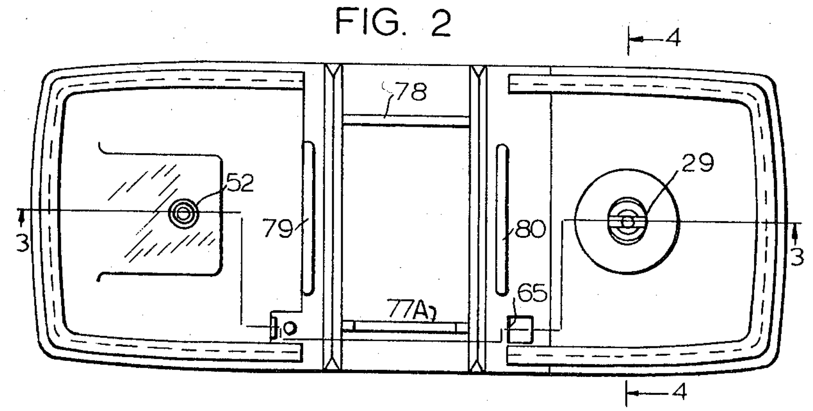
FIGURE 2 is a plan view of the integral side case member.
Figure 3:
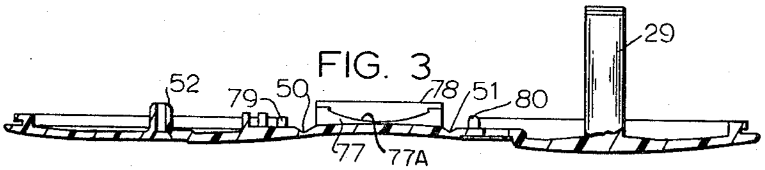
FIGURE 3 is a partial elevation section view of the sidecase taken along line 3—3 of FIGURE 2.
Figure 9:
FIGURE 9 is a left end elevation of FIGURE 8.
Figure 8:
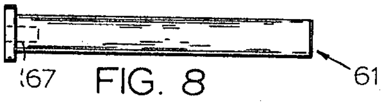
FIGURE 8 is a side elevation view of a lock pin employed in this invention.
Figure 6:
FIGURE 6 is a left end elevation of FIGURE 5.
Figure 5:
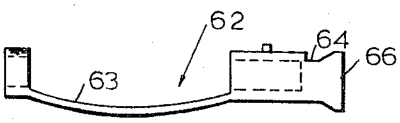
FIGURE 5 is a side elevation view of a lock button employed in this invention.
Figure 7:
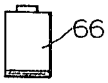
FIGURE 7 is a right end elevation of FIGURE 5.
Figure 4:
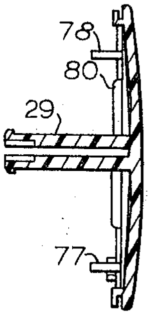
FIGURE 4 is an elevation section view of the sidecase taken along line 4—4 of FIGURE 2.
Figure 14:
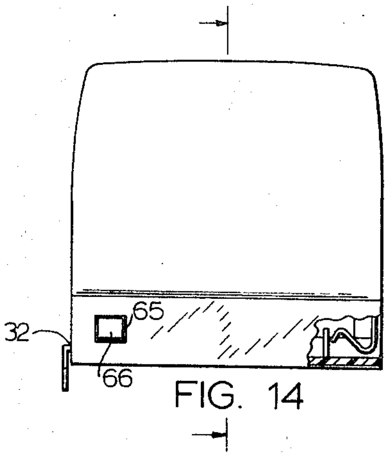
FIGURE 14 is a side elevation view of the assembled rule with a portion of the sidecase cut away to show how the case is held closed.
Figure 13A:
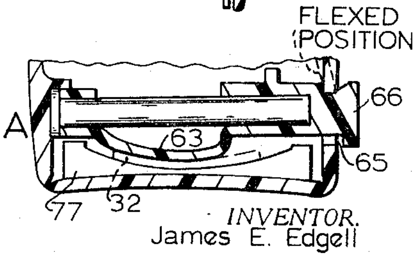
FIGURE 13A is like FIGURE 13 but with the locking mechanism in locked position.

The outer end of sleeve 62 terminates in the form of a push button knob 66. Sleeve 62 also includes a notch 64 which can be brought into engagement with the edge of a hole 65 which is located in side wall 47 and which slidably receives the exposed end of sleeve 62. As may be noted particularly in FIGURES 13 and 13A, when button 66 is pushed inwardly web 63 flexes and presses against the upper surface of tape 32 with sufficient force to wedge tape 32 against tape guide 77 which provides a bottom wall locking surface. The length and position of web 63 is designed with this purpose in mind. At the same time, the notch 64 may be engaged with hole 65 so as to retain sleeve 62 in the locked position. Thus, at any extended position of tape 32, button 66 may be pressed inwardly until the notch 64 locks and in such position web 63 will tend to effectively rigidly lock tape 32 in position. Sleeve 62 can be released either by squeezing the side walls 46, 47 together or by pressing sleeve 62 downwardly so as to bend wall 47 and disengage notch 64 from hole 65. Whenever sleeve 62 is released by pressing in the side walls 46, 47, both the positive lock provided by web 63 as well as the releasable brake provided by the action of flange 33 and plate 35 are released. On the other hand, if sleeve 62 only is disengaged, the releasable brake provided by flange 33 and plate 35 is maintained. Another aspect of the invention of particular interest is the fact that since web 63 is made with an inherent resiliency, once sleeve 62 is disengaged from its locked position the inherent resiliency of web 63 will tend to move sleeve 62 back into a non-locking position.

In order to better understand the releasable braking action provided by side walls 46, 47, flange 33 and plate 35, it may be noted that the tape is normally squeezed between plate 35 and flange 33 and such pressure can be released by pressing or squeezing on the walls 46, 47. This action is explained in the subject co-pending applications and may be seen in reference to the present application particularly with reference to FIGURE 12. Walls 46, 47 are formed so that they bulge outwardly and due to the nature of the plastic material employed, they each have a natural spring action very much like the action of the bottom of an oil can. The length of post 29 is designed so that flange 33 and pressure plate 35 are normally forced toward each other so as to assert a releasable friction against the outer edges of tape 32. When walls 46, 47 are squeezed together, this friction force is released and drum 27 and pressure plate 35 are given some play or freedom to move on post 29. Stated differently, the "working length" of post 29 is increased whenever the walls of sidecase 26 are squeezed together and thus the braking action is controlled simply by squeezing and releasing side walls 46, 47 of sidecase 26. Since this squeeze type of releasable braking action is taught and claimed in the referred to co-pending applications, it should be noted that its relation to the present invention arises by reason of the fact that the present invention uses such squeeze action as a means to release the positive lock mechanism 60. That is, once button 66 has been fully depressed so as to bring web 63 into a positive locking relation, sleeve 62 can be released either by pushing downwardly on sleeve 62 or by pressing the side walls 46, 47 together. That is, the shape of the notch or offset 64 and the size of hole 65 are arranged such that when side wall 47 is pressed inwardly the notch 64 tends to become disengaged from the hole 65 and by reason of the inherent resiliency of web 63, the depressing button 66 tends to pop back outwardly to a non-locking position in which the offset 69 of sleeve 62 rests against the inside of wall 47 (see FIGURE 13). It becomes apparent then that the user of the tape rule of the present invention can independently positively lock or releasably brake the tape a feature which so far as known has not heretofore been obtained. Furthermore, the operator can disengage the positive lock without affecting the releasable brake.

For assembly, the left side wall 46 of sidecase 26 is provided with an inverted U-shaped rib 70 and the right side wall 47 is provided with a similar rib 71. It will also be noticed that clip 25 is provided with inverted U-shaped lips 72 and 73, the latter being designed to engage the respective ribs 70, 71 so as to provide a means for holding the side walls 46, 47 in their respective positions. That is, when clip 25 is assembled to sidecase 26, the ribs 70, 71 are brought into locking engagement with the respective lips 72, 73. Clip 25 will also be noted as having a front clip section 74 and a rear clip section 75. In final assembly the front clip section 74 is secured under the bottom and lower portions of the front vertical runs of ribs 70, 71 so as to engage the rib portions indicated at 76, 76A. Rear clip section 75 is secured in a similar manner.

After the pressure plate 35 has been snapped over the enlarged end of post 29 and the tape lock mechanism 60 has been assembled on pin 59, the sidecase 26 is folded into a U-shape so that stud 52 on wall 46 is aligned with and forced into the hole in post 29. As previously mentioned, the diameter of stud 52 is such that it prevents post 29 from collapsing once stud 52 has been installed in post 29 and the enlarged portions 40, 41 of post 29 are forced outwardly so as to retain drum 27, spring 28 and plate 35 on post 29. After the sidecase 26 has been folded, stud 52 installed as described, and with the offset portion 69 of sleeve 62 resting against the inside of hole 65, clip 25 is fitted with its lips 72, 73 and front and rear clip sections 74, 75 engaging ribs 70, 71 as previously discussed in such manner as to keep the whole assembly locked together and to provide a slot for the tape 32 as indicated at 77A. Tape guide 77 against which tape 32 is pressed when locked reduces rattle due to vibration of the tape 32 against the tape slot 77A once the braking force is released. Also integral with bottom wall 45 in its interior opposite tape guide 77 is an end closure 78 which helps define the travel of tape 32. Both tape guide 77 and end closure 78 furthermore act to stiffen and preserve the concave bottom wall 45. Another pair of stiffener members 79, 80 are made integral with respective side walls 46, 47 and extend parallel to the "living hinges" formed at 50, 51. A belt clip 85 may be secured by means such as screw 87 to side 46 of the case.

In summary, it is seen that the present invention provides a much improved structure while retaining all of the advantages of the rule housing and brake structure disclosed in the co-pending applications. Further, the rule of the present invention by reason of the described drum and tape lock structure aids and makes easier and more convenient the transferring of measurements and gives the needed protection against accidental movement of the tape into the case once it has been set at some desired position.

What is claimed is:

1. In a flexible tape rule having a case with bottom, top, front, rear and side walls and, including a tape slot between the front and bottom walls, a post fixedly mounted within the case, a recoil spring mounted on the post and a measuring tape connected to the spring and extending through the slot, the improvement for locking said tape in any given position, comprising:

(a) a resilient, flexible, substantially thin, web positioned within said case adjacent said slot, above and across said tape and having integral end portions enabling said web to be supported thereby and said web having a central surface arranged move toward said tape when flexed;

(b) means mounting one of said web end portions within said case adjacent one of said side walls in a substantially fixed position and mounting the other of said web end portions for slidable movement through the side wall opposite said side wall thereby adapting said web end portions for relative axial movement and said axial movement causing said central surface to move toward said tape; and (c) manual press button means secured to the said other end portion extending through and slidably engaging the opposite said side wall, the inherent resiliency and shape of said web being selected such that said web tends to maintain said end portions spaced relatively outwardly on said mounting means, said web out of engagement with said tape and said button means in an outward non-locking position, inward movement of said push button means being effective to flex said web and bring said central surface of said web into resilient engagement with a central surface portion of said tape whereby to positively lock said tape against said bottom wall.

2. In a rule as claimed in claim 1 wherein:

(a) said web portions are generally cylindrical and hollow, (b) said mounting means includes a shaft supported on one end by one of said side walls and slidably mounted in said pushbutton means, (c) said button means is mounted in the opposite of said side walls and is formed integral with the web end portion to which it is secured, and (d) said button means is formed internally of the case with means effective to limit the outward travel thereof and externally of the case with means enabling said button means when in an inward position to be releasably locked to the side wall in which it slides.

3. In a rule as claimed in claim 1 wherein:

(a) a least the opposite of said side wall being flexible and resilient, (b) within said case there is provided plate braking means engaging an edge of said tape and effective to assert a releasable braking action on said tape, said braking means being positioned by said resilient wall, being normally engaged and being releasable upon inward pressing of said resilient wall, and (c) said press button means is mounted in said resilient wall and is formed such that when in an inward locking position it can be releasably locked to said resilient wall but is released therefrom upon said inward pressing of said resilient wall.

4. In a rule as claimed in claim 3 wherein the said locking formation of said button means constitutes a notch which can releasably engage said resilient wall.

5. In a rule as claimed in claim 1 wherein said bottom wall includes an integral upstanding rib portion and the surface of said bottom wall against which said tape is locked comprises said upper surface of said rib portion.

6. In a flexible tape rule, the combination of:

(a) a case with bottom, top, front, rear and side walls and including a tape slot between the front and bottom walls, said bottom and side walls being formed of an integral flexible resilient material;

(b) a post formed integral with and extending from one of said walls;

(c) a drum rotatably mounted on said post and having a cylindrical body with a slot for passing a connected tape and spring and a flange at one end of said body, said drum being mounted on said post such that said flange is adjacent that side wall from which said post extends;

(d) a tape retracting spring coiled within said drum body about said post and having one fixed to said post;

(e) a measuring tape coiled around said drum body and having one end connected to said spring through said drum slot and the other end extending through said tape slot;

(f) a pressure plate slidably mounted on said post such that said tape mounts between opposed surfaces of said flange and plate; said post including means effective to limit the outward travel of said plate and drum member thereon, said plate and flange when forced together tending to releasably brake said tape;

(g) a clip member forming said front, top and rear walls, said clip member and side walls being formed with self sustaining interengaging connections effective when joined to maintain said rule in proper assembly;

(h) a resilient flexible substantially thin web positioned within said case adjacent said tape slot above and across said tape and having integral cylindrical hollow end portions enabling said tape to be supported thereby;

(i) a shaft supported on one of said side walls and slidably mounting said end portions; and (j) manual press button means having an inner portion formed integral with one of said web end portions and an integral outer portion extending through and slidably engaging one of said side walls and providing a finger press surface, said inner portion being formed with means effective to limit the outward travel of said button means and said outer portion being formed with means enabling said button means to be releasably locked in an inward position to the side wall in which it slides but being releasable therefrom when such side wall is moved inwardly;

the inherent resiliency and curvature of said web being selected such that said web tends to maintain said end portions spaced relatively outwardly on said shaft, said web out of engagement with said tape and said button means in an outward non-locking position, inward movement of said push button means being effective to flex said web and bring said web into resilient engagement with said tape whereby to positively lock said tape against said bottom wall, and the inherent resiliency and curvature of said side walls being selected such that in the normal position of said side walls said flange and plate tend to releasably brake said tape therebetween, inward movement of said side walls being effective to increase the travel of said drum and plate on said post and thereby release said tape and further being effective to release said button means when in its inward locked position.

References Cited

UNITED STATES PATENTS 2,132,202 10/1938 Carlson ------------- 33—138

LEONARD FORMAN, *Primary Examiner.*

S. L. STEPHAN, *Assistant Examiner.*

U.S. Cl. X.R.

242—107.2, 107.3

UNITED STATES PATENT OFFICE
CERTIFICATE OF CORRECTION

Patent No. 3,443,316

May 13, 1969

James E. Edgell

It is certified that error appears in the above identified patent and that said Letters Patent are hereby corrected as shown below:

Column 6, line 39, after "web" insert -- end --; line 53, "a" should read -- at --; same line 53, cancel "of".

Signed and sealed this 14th day of April 1970.

(SEAL)
Attest:

Edward M. Fletcher, Jr.
Attesting Officer

WILLIAM E. SCHUYLER, JR.
Commissioner of Patents